W. S. SMITH.
REPLENISHING ELECTROLYTIC CELLS.
APPLICATION FILED JUNE 3, 1915.
1,191,356.
Patented July 18, 1916.
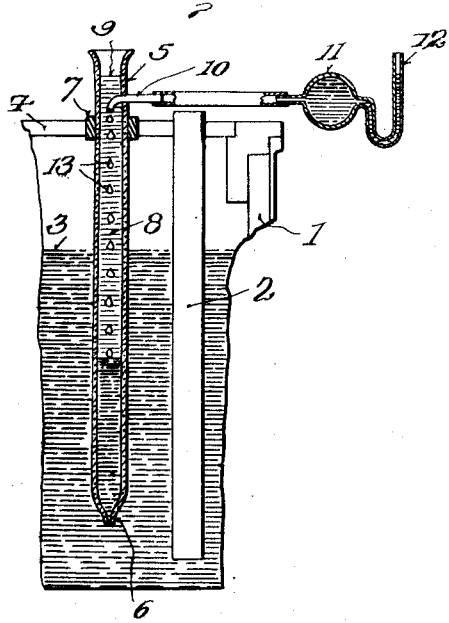
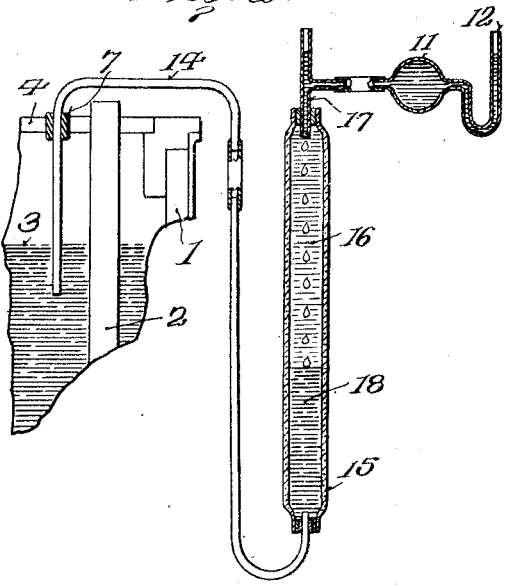
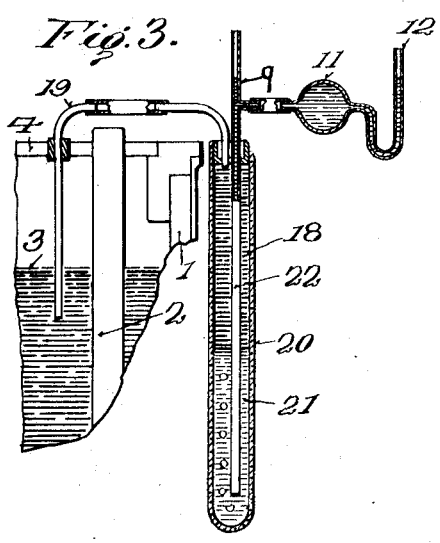
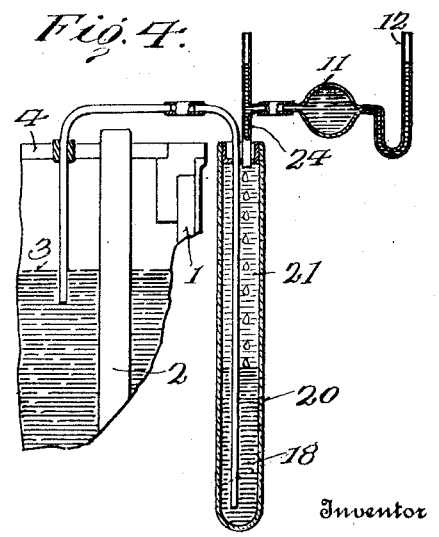
Witness
Inventor
Walton S. Smith
By K. P. McElroy
Attorney

UNITED STATES PATENT OFFICE.

WALTON S. SMITH, OF GROSSE ILE, MICHIGAN, ASSIGNOR TO PENNSYLVANIA SALT MANUFACTURING COMPANY, OF PHILADELPHIA, PENNSYLVANIA, A CORPORATION OF PENNSYLVANIA.

REPLENISHING ELECTROLYTIC CELLS.

1,191,356.     Specification of Letters Patent.     Patented July 18, 1916.

Application filed June 3, 1915. Serial No. 31,847.

*To all whom it may concern:*

Be it known that I, WALTON S. SMITH, a citizen of the United States, residing at Grosse Ile, in the county of Wayne and State of Michigan, have invented certain new and useful Improvements in Replenishing Electrolytic Cells, of which the following is a specification.

This invention relates to replenishing electrolytic cells; and it comprises a method of replenishing electrolytic cells and of maintaining constant level of the bath of electrolyte therewithin without leakage of current wherein such bath is maintained in hydrostatic equilibrium with a source of supply of such electrolyte through an intermediate column or layer of a dielectric or insulating liquid immiscible with such electrolyte, incoming electrolyte to replenish such bath and to maintain such level being caused to pass through such column in spaced bodies or drops; and it also comprises as a new combination of apparatus elements, an electrolytic cell, a source of supply of electrolyte therefor and an intervening container adapted to contain and maintain a column of immiscible insulating liquid in liquid communication with said cell and with said source, said container being so placed and so arranged as to allow feed of liquid from said source through said column to said cell; all as more fully hereinafter set forth and as claimed.

In the operation of electrolytic cells using an aqueous electrolyte with constant feed of such electrolyte difficulties obtain in maintaining a constant level of the electrolytic bath; these difficulties being partly mechanical and partly electrical. In order to reduce resistance the thickness of the layer of liquid between the poles, or between poles and intervening diaphragm devices, must be made as small as possible; and there is obviously little room for complicated level-maintaining devices in the cell itself. Metal parts cannot be used therein. Since the incoming column or stream of electrolyte is of course a relatively good electrical conductor there is always the possibility of electrical leakage; of stray current flowing backward from the cell to the source of supply along the stream of electrolyte. For this reason methods of maintaining constant level of bath by means of a hydrostatic equilibrium through a liquid connection between bath and source of supply have heretofore been highly objectionable.

I have however found that I can obtain the advantages of maintenance of level by hydrostatic equilibrium without the noted disadvantages and attain sundry new advantages in the operation of a cell by the simple expedient of interposing a column or layer of non-conducting or insulating liquid in the liquid connection between cell and supply and arranging that electroylte flowing between source of supply and bath shall drop or rise through such insulating column. In so doing each drop is of course spaced and isolated by the surrounding non-conductor and there is no possibility of a current flow backward from the bath to the source of supply.

For obvious reasons, I maintain the insulating liquid as a more or less vertical column. Where the insulating liquid is lighter than the electrolyte, as in using kerosene, lubricating oil, cottonseed oil, etc., I feed electrolyte downward through the column to the bath; where it is heavier, as in using chloroform, carbon tetrachlorid, etc., I feed the electrolyte upward. This vertical column is maintained in hydrostatic equilibrium with the bath electrolyte and also with the source of supply, and is so located and arranged that it has no tendency to flow toward either.

In a simple embodiment of my invention I may place an open ended vertical glass tube in the electrolytic bath with its upper end rising above the surface of the bath. Into this tube I pour a little kerosene or other oil. The kerosene forms a layer in the tube of a somewhat higher level than that of the bath; the difference in level being due to the difference in specific gravity. Into this tube I introduce the end of a feed conduit communicating with a source of electrolyte supply, at a level corresponding to the normal level to be maintained in the bath; or under pressure equivalent to the height of the liquid in the bath. As the level in the bath decreases, the column of kerosene falls somewhat in the tube and new liquid enters from the source of supply. The level maintained in the bath in this method depends in part upon the height of the column of kerosene and may of course be varied by varying the height of such column. The entering liquid falls through the column of kerosene as spaced and insulated drops or bodies.

The above method of operating is particularly convenient in the type of alkali-chlorin cells electrolyzing common salt and having a constant feed of brine. These cells are customarily in rather large units and are so constructed that there is but little room between the poles, or between the poles and the diaphragms while at the same time a relatively large constant supply or feed of electrolyte is required. In securing constant feed under the present invention it is not necessary to place any additional apparatus within the cell, since the only element required is a narrow tubular device, which may be a narrow glass tube for holding the kerosene or the like, and this may be mounted outside the bath. If mounted within the bath, the room it requires is inappreciable. Tubes of other dielectric material than glass may of course be used in its lieu.

In the accompanying illustration I have shown, more or less diagrammaticaly, sundry combinations of apparatus elements within the described invention and useful in the performance of the described process.

Figure 1 is a fragmentary vertical section of the anode chamber of a cell for electrolyzing salt solution or brine and having the new method of feed. Fig. 2 is a similar view of a modification; Fig. 3 is a view of another modification; and Fig. 4 is still another modification.

In the structure of Fig. 1, element 1 is a cell of common type provided with anode 2. Within this cell the liquid should remain at a normal level 3. Passing through the top 4 of the cell is a tube 5 of glass or rubber or other dielectric material having an open funnel top and a somewhat contracted bottom outlet 6. This tube may be held in the top of the cell by gasketing means 7. Within the tube is a layer of kerosene 8 rising to a point 9 above the normal level of electrolyte in the cell, this excess in height being due to the light specific gravity of the kerosene which requires a longer column of kerosene to balance the electrolyte hydrostatically. The level of the electrolyte in the bath may be adjusted by adusting the height of this column of kerosene. The greater the depth of the oil in the tube the lower the electrolyte in the cell will stand and vice versa. Entering the tube is a brine feed conduit 10 leading from a source of supply 11. Device 12 is provided for the purpose of observation of the pressure or level of the brine or other electrolyte in 11. The operation of this device will be readily understood from the foregoing. The head 9 of the kerosene balances hydrostatically not only against the electrolyte level 3 in the cell but against the liquid level or pressure in source of supply 11. As the level of the electrolyte in the cell tends to fall, the column of kerosene falls somewhat allowing electrolyte to enter from the source of supply. This electrolyte falls through the kerosene as drops 13, each being surrounded and insulated by the kerosene. And the column of kerosene forms an insulating layer between the bath liquid and the liquid of the source of supply.

In Fig. 2, the construction and mode of operations are similar but the level controlling device containing the column of dielectric liquid is mounted outside the electric cell proper. As before, 2 is an anode in a chamber having a normal liquid level at 3. Liquid is supplied to the electrolyte through conduit 14 which communicates at its base with a vertical tube 15 containing a layer 16 of kerosene or like relatively like dielectric liquid. Fresh electrolyte enters through 17, which is shown as a 3-way tube having one leg depending into the kerosene tube while the other extends upwardly and is open at the top. At the side it communicates as before with a source of supply 11 having level or pressure indicating device 12. The entering electrolyte drops through the layer of liquid as before until it reaches the layer of electrolyte 18 in the bottom of the tube. From this it passes through the feed conduit 14 into the cell as it is required.

In Fig. 3 is shown an alternative form of device using a column of a heavy insulating liquid. In this showing the electrolyte in the bath is in fluid communication through 19 with a layer 18 of electrolyte in the top of a tubular device 20 mounted outside the cell proper. Within this tubular device is a layer 21 of chloroform, carbon tetrachlorid, or other heavy insulating liquid. Dipping deep into this insulating layer or stratum is a tube 22 bringing electrolyte from source of supply 11. The top of this tube is open and continued upwardly to give the balancing head 9, as in the previous figures.

Fig. 4 constructively is exactly the same as the device of Fig. 3 save that a light liquid column is employed and instead of having a long tube, such as 22, a short tube 24 is employed. With this short tube the electrolyte falls through the insulating layer of light dielectric fluid instead of rising through the dielectric fluid as in Fig. 3.

What I claim is:—

1. In the operation of electrolytic cells and similar devices, the process of maintaining a constant level of electrolyte therein which comprises maintaining the electrolyte of the cell in hydrostatic balance with an exterior replenishing source of electrolyte through an intermediate column of immiscible dielectric liquid.

2. In the operation of electrolytic cells and similar devices, the process of automatically maintaining a constant level of electrolyte in such a cell which comprises feeding electrolyte to said cell from a source of supply through a column of dielectric liquid immiscible with such electrolyte, the electrolyte at normal level and the said column conjointly having a head sufficient to balance the head under which said electrolyte from said source of supply tends to feed forward to said cell.

3. In the operation of electrolytic cells and the like, the process which comprises establishing and maintaining a balancing connection between a body of electrolyte in a cell and a body of replenishing electrolyte through an interposed column of immiscible dielectric liquid in liquid contact with said bodies, such balancing connection being so established and maintained that fall of liquid level in the first named body results in detachment of portions of liquid from the second named body and passage through the dielectric liquid to the first named body till balance is again obtained.

4. In the operation of electrolytic cells and similar devices, the process which comprises feeding electrolyte into such a cell from a source of supply in hydrostatic balance with the bath of electrolyte in such cell but insulated from such bath.

5. In the operation of electrolytic cells and similar devices, the process of automatically maintaining a constant level of electrolyte in such a cell which comprises establishing and maintaining a vertical column of immediate liquid in fluid communication with the electrolytic bath in said cell at one end of such column and feeding fresh electrolyte into the other end of such column to replenish such bath, the electrolyte at normal level and the said column conjointly having a head sufficient to balance the head under which said electrolyte from said source of supply tends to feed forward to said cell.

6. In the operation of electrolytic cells and similar devices, the process which comprises establishing and maintaining a column of immiscible insulating liquid in hydrostatic balance with the electrolytic-bath in such a cell and feeding such bath with fresh electrolyte introduced through such column.

7. In the operation of electrolyte cells, the process which comprises establishing and maintaining a column of insulating liquid in hydrostatic balance with the electrolyte in such a cell and establishing and maintaining a hydrostatic balance between such column and a source of supply of fresh electrolyte in such manner that diminutions in the amount of electrolyte in the cell lead to the passage of fresh electrolyte through such insulating liquid column to the electrolyte in the cell.

8. In an electrolyte apparatus, a cell containing electrolyte, a tubular container containing a body of liquid insulating material in liquid communication and hydrostatic balance with said electrolyte and a supply of fresh electrolyte in liquid communication and hydrostatic balance with said body of liquid insulating material.

In testimony whereof, I affix my signature.

WALTON S. SMITH.

Copies of this patent may be obtained for five cents each, by addressing the "Commissioner of Patents, Washington, D. C."